United States Patent [19]

James et al.

[11] 4,283,705

[45] Aug. 11, 1981

[54] SYSTEM FOR PROVIDING AN INTEGRATED DISPLAY OF INSTANTANEOUS INFORMATION RELATIVE TO AIRCRAFT ATTITUDE, HEADING, ALTITUDE, AND HORIZONTAL SITUATION

[76] Inventors: Robert James, Lancaster, Calif.; Alan M. Lovelace, Administrator of the National Aeronautics and Space Administration, with respect to an invention of Robert James

[21] Appl. No.: 43,942

[22] Filed: May 30, 1979

[51] Int. Cl.³ .............................................. G08G 5/00
[52] U.S. Cl. .............................. 340/27 NA; 73/178 R
[58] Field of Search .......... 340/27 R, 27 AT, 27 NA; 33/328–330; 73/178 R, 178 T; 35/12 F, 12 N, 12 L; 116/DIG. 43; 343/107, 108 R; 364/424, 443, 433, 434; 244/181; 358/103

[56] References Cited

U.S. PATENT DOCUMENTS

| | | | |
|---|---|---|---|
| 3,521,227 | 7/1970 | Congleton et al. | 73/178 R |
| 3,521,228 | 7/1970 | Congleton et al. | 340/27 NA |
| 3,803,611 | 4/1974 | Becker | 340/27 NA |
| 4,149,148 | 4/1979 | Miller et al. | 340/27 NA |

OTHER PUBLICATIONS

"Stars", Sperry Rand, pp. 1–36.
"FD-108, Flight System", Collins Radio, 1966, pp. 1–23.

Primary Examiner—James J. Groody
Attorney, Agent, or Firm—Monte F. Mott; John R. Manning; Paul F. McCaul

[57] ABSTRACT

A display device particularly suited for providing the pilot of an aircraft with combined inflight attitude, heading, altitude, and horizontal situation information previously available only by using two or three devices providing separate displays. The preferred embodiment of this invention combines a commonly used and commercially available flight director-type device for providing a display in combination with a miniature aircraft supported for angular displacement from a vertical orientation to indicate heading error, or heading offset, and an extended course deviation indicator bar which projects into juxtaposition with the miniature aircraft for providing a true picture of the aircraft's horizontal situation relative to a selected VOR, ILS, or MLS course.

2 Claims, 23 Drawing Figures

SYSTEM FOR PROVIDING AN INTEGRATED DISPLAY OF INSTANTANEOUS INFORMATION RELATIVE TO AIRCRAFT ATTITUDE, HEADING, ALTITUDE, AND HORIZONTAL SITUATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to aircraft instrumentation and more particularly to an integrated attitude, altitude, and horizontal situation indicator display particularly suited for use in providing an aircraft pilot with critical inflight attitude, altitude, and horizontal situation information relative to a selected flight path in a more intuitively understandable manner. Furthermore, by combining on a single display intelligence, previously available only on multiple displays, a pilot is provided with all of the necessary flight parameters needed to control his flight path during both enroute navigation and final approach to landing under instrument conditions. This eliminates the heretofore existing need to scan several instruments in order to obtain the same information.

It is important to understand that the display unit of the instant invention is intended to operate in either a SITUATION MODE or a COMMAND MODE. In the SITUATION MODE the "true" angular relationships and offsets relative to a selected radial from a navigational facility, such as VOR, MLS, or ILS, or course, are displayed in a "true" pictorial form along with attitude and altitude information. The SITUATION MODE also embodies a heading submode in which errors from a selected heading are pictorially presented in an intuitively simple manner.

In the COMMAND MODE, angular relationships and offsets from a "computer-generated" course are displayed to a pilot in substantially the same manner as that heretofore described. The difference between the SITUATION MODE and the COMMAND MODE exists in the fact that in the SITUATION MODE, the pilot sees his true relation to a selected VOR, MLS, or ILS course or radial, and seeing this, can decide on the most appropriate flight path necessary to intercept and capture such course or radial. In the COMMAND MODE, however, a course is generated within a flight director computer and the pilot then sees his angular relationships and/or offsets with respect to the computer generated course which, if followed, will cause the aircraft to turn, climb, or descend as is necessary to smoothly intercept the selected VOR, MLS, or ILS course or radial.

Within the SITUATION MODE of operation for the display, submodes of heading (HDG), navigation (NAV), and approach (APPROACH) are available for displaying the total amount of intelligence necessary to control the aircraft. In the COMMAND MODE of operation, submodes of NAV and APPROACH are available to furnish all of the necessary information to control an aircraft to conform that the computer-generated flight path will carry the aircraft to its intended destination.

2. Description of the Prior Art

The prior art is, of course, replete with instrumentation including devices and systems the primary purpose of which is to provide pilots of aircraft with information relative to aircraft heading, altitude, attitude, course and glideslope deviation, as well as other information not here pertinent. Of primary concern here, however, is instrumentation having a capability for depicting altitude and attitude information, angular and lateral displacement from selected radials, and flight director computer steering information.

Horizontal situation indicators for providing heading errors and lateral offsets from VOR, MLS, or ILS radials are commercially available from many sources such as, for example, Sperry Rand Flight Systems Division, Phoenix, Ariz., King Radio Corporation, Olathe, Kans., Bendix Avionics Divisions, New York, N.Y., Lear Siegler Instrument Division, Grand Rapids, Mich., Collins Radio Company, Cedar Rapids, Iowa, and others.

Moreover, separate horizontal situation indicators are widely used in aviation and instrumentation capable of providing horizontal situation information only are manufactured and sold by most of the companies aforementioned. Typical of these displays are the Sperry RD-350A display, the Edo-Aire Mitchell Navigation Situation Display, the King Radio KCS 55 Pictorial Navigation System, and the Bendix FCS-810 Horizontal Situation Indicator. All of these instruments provide horizontal situation information, and only horizontal situation information.

Also well known are flight director indicators which serve to combine aircraft attitude displays with steering information or lateral and vertical offset information. Such instruments generally superimpose course and glideslope deviation needles, steering dots, or command bars over the face of a command gyroscopic display. Typical of these instruments are the Lear Siegler Mode 4058F and 4061D Attitude Direction Indicators, the Edo-Aire Mitchell Steering Horizon, the Sperry Flight Systems HZ-6F Flight Director, and numerous others.

Separate course and glideslope indicating systems are also manufactured by most of the aforenamed companies. These units generally are considered similar in design and function and are typically represented by the King Radio Company KI 213, KI 214, and KI 520 VOR/LOC indicators.

Consequently, it can be appreciated that an aircraft may be equipped with instrumentation fed by signals derived from pressure altimeters, radar altimeters, navigation receivers, heading reference systems, and onboard computers which utilize flight data and navigational signals and drive devices capable of providing displays designed to indicate situation errors, steering commands, pitch and roll commands, and/or course and glideslope deviations necessary to control an aircraft over either a selected or computed flight path.

It also must be noted that numerous terminal guidance systems heretofore have evolved for generating guidance commands adopted to be displayed to a pilot so as to enable him to control his aircraft in such a manner that will optimize his interception of a selected course or glideslope. Most of these systems have either been implemented as hard-wired analog logic or digital computer algorithms which, upon receipt of flight and navigational information from onboard radios and flight sensors, output guidance commands that may be implemented using one or more types of flight director displays.

Notwithstanding the numerous guidance systems currently available it is well recognized that under stress and adverse conditions encountered by pilots or aircraft operators, it is quite easy for a pilot to become confused by factors which normally would not overtax a human mind under less stress. When overtaxed, pilots tend to exhibit a propensity to incorrectly interpret even the simplest intelligence and fail to act, or, conversely, tend to over react. In addition, when under stress, a pilot's ability to scan several instruments and assimilate the information contained on each into an optimum control response, often is seriously impaired. A common difficulty encountered under instrument flight conditions is that of maintaining a continual, fast, repetitive scan of all flight instruments from which critical altitude, heading, attitude, and horizontal situation information must be obtained. A further common difficulty is that of fixation with a single instrument whose indicated parameter may have excessively varied from that desired. This type of fixation frequently results in excessive variation in parameters displayed on the other instruments, because of the excessive concentration devoted to the correction of the first discovered or discrepant parameter.

Consequently, in view of the recognized inadequacies of the human mind when under stress, there exists continuous concern and an ongoing effort to provide systems, devices, and techniques which simplify interpretation of data presented to pilots in flight, whereby the pilots continuously are better equipped to cope with conditions which heretofore often led to the undesirable consequences of pilot error.

It is, therefore, the general purpose of the instant invention to provide for a single display on which all critical flight and navigational parameters are simultaneously displayed and to do so in a manner which is intuitively simple for the pilot to use and interpret and thus enhance pilot efficiency and safety.

OBJECTS AND SUMMARY OF THE INVENTION

It is, therefore, an object of this invention to provide a low cost, economical system for providing total flight and navigational information required to control an aircraft along a preselected flight path during instrument conditions.

It is another object of the instant invention to provide a system for generating an integrated display of aircraft attitude; aircraft heading, both pictorial and numeric; altitude and/or glideslope deviation; course deviation; horizontal situation, angular and lateral offsets from a selected course or radial; TO/FROM VOR indications; radial or course selection and numeric display; and FRONT COURSE/BACK COURSE selection and display.

It is another object to provide an integrated horizontal situation display unit, adapted to be mounted in the cockpit of an aircraft and employed in a HDG (heading) submode for simultaenously providing inflight intelligence for enabling a pilot to maintain a preselected altitude, to control attitude and to capture and maintain a preselected heading, without confusion as to the "shortest direction to turn" and, once captured, will permit the pilot to maintain the heading while simultaneously monitoring attitude and altitude of the aircraft.

It is another object to provide a combined attitude and horizontal situation display unit particularly suited for use in a NAV (navigational) submode of a SITUATION MODE for presenting an aircraft pilot with combined attitude, altitude, and horizontal situation information relative to a selected VOR course, or radial, using VOR/LOC receiver and converter systems commonly available and well known to aircraft operators, while maintaining a preselected altitude, attitude, horizontal situation, whereby control over an aircraft is achieved through an observation of a single integrated display instrument.

It is another object to provide an instrument having a capability of displaying an integrated attitude and horizontal situation display particularly suited in an APPROACH SUBMODE whereby aircraft attitude and instantaneous course and glideslope deviations are instantaneously displayed and a continual pictorial representation of the aircraft's angular and lateral offsets from the final approach course is provided for use by an aircraft pilot on an ILS or MLS approach to landing at a selected airfield.

It is another object to provide a display mechanism for communicating position and steering information provided by any one of several commercially available flight director computers intended to function in a CMD/NAV (command/navigational) MODE to provide guidance information for facilitating a smooth intercept of a selected course or radial and to intercept and maintain a desired altitude.

It is another object to provide a display mechanism adapted to function in an CMD APPROACH MODE for communicating position and steering information provided by one of several commercially available flight director computers intended to provide guidance information to permit a pilot to smoothly intercept and maintain course and glideslope during an ILS (instrument landing system) or MLS (microwave landing system) approach to landing.

These, together with other objects and advantages, are achieved by integrating into a signal display unit features commonly provided separately in a gyro display, a course and glideslope deviation indicator, a horizontal situation indicator, and numeric readout devices, as will become more readily apparent in view of the following description and claims in light of the accompanying drawings.

DESCRIPTION OF THE DRAWINGS

FIGS. 8a through 11b collectively depict representative situations relative to common conditions encountered in instrument flying, with respect to VOR or LOC/glideslope signals, while enroute to and/or reaching a destination airport.

DESCRIPTION OF THE PREFERRED EMBODIMENT

Figure 1:
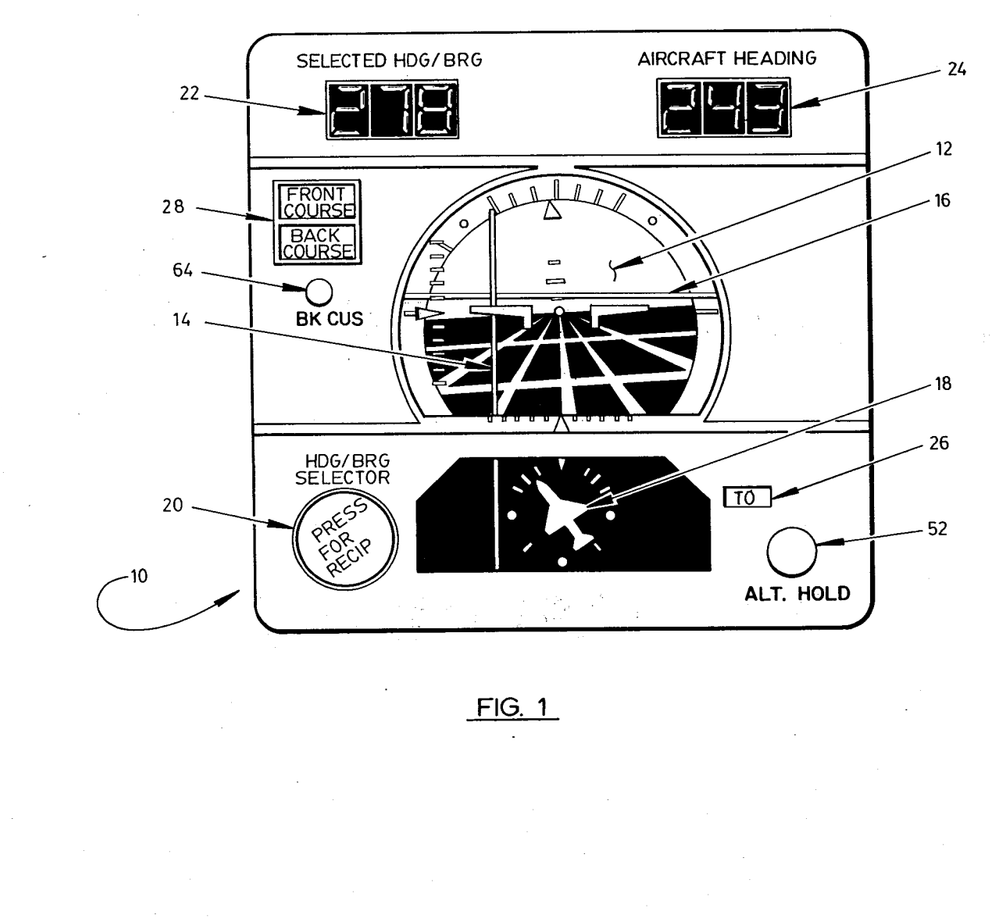
FIG. 1 is a pictorial view of a display generated by a display unit included in the system embodying the principles of the instant invention.
Figure 2:
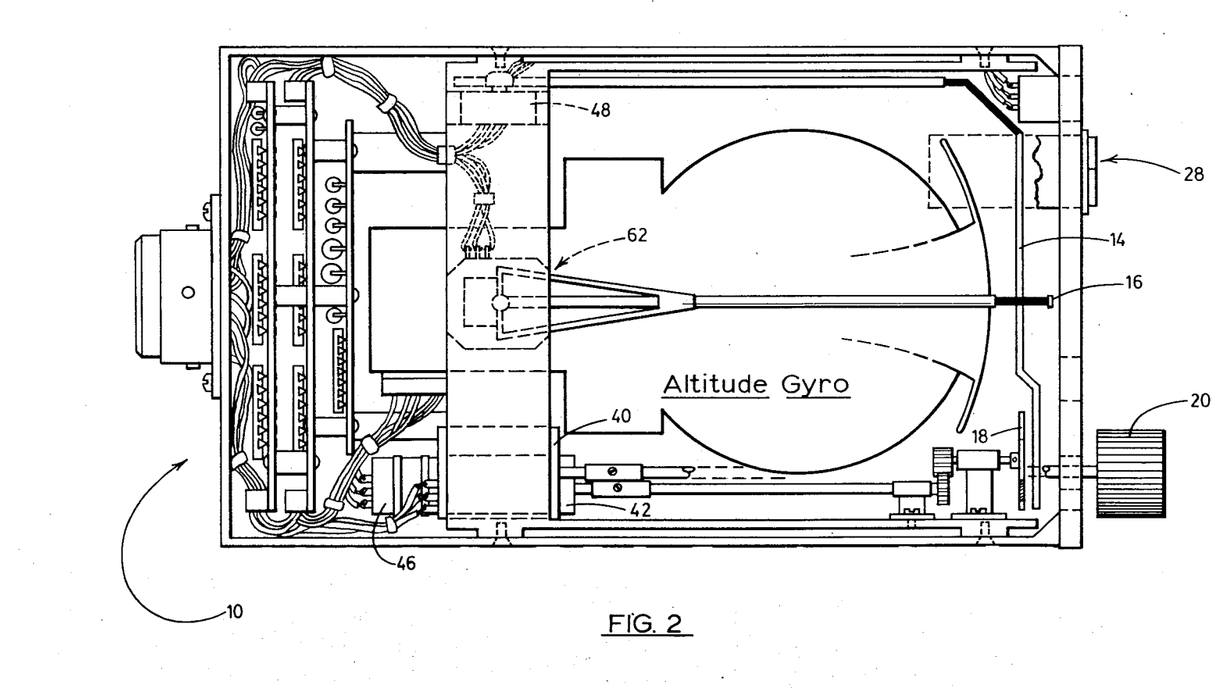
FIG. 2 is a cross sectional view of the display unit shown in FIG. 1.

At the outset, it is important to appreciate that the system which embodies the principles of the instant invention includes a display unit 10, FIG. 1, suited for providing information relating to the attitude, altitude, and horizontal situation for an aircraft, herein for the sake of convenience referred to as a piloted aircraft, within which the unit 10 is mounted. The unit 10 is adapted to be connected, in slaved relation, with commercially available and commonly known devices, aforementioned, frequently employed for acquiring information relating to flight parameters and providing navigation signals.

For SITUATION MODE applications, which do not require command-type inputs to the unit 10 from an onboard computer, the basic system for driving the display unit 10 consists of a heading reference subsystem; an altitude reference subsystem; a VOR/LOC receiver converter circuit; a glideslope receiver circuit; and a control panel module. The above-mentioned subsystems, circuits, and panel module are available from several well known instrument manufacturers, previously named.

For expanded COMMAND MODE capabilities, the basic system also may include a flight director computer employed to generate steering information to RNAV, VOR, ILS, or MLS inbound courses.

Again, it is important to appreciate that flight director computers having the capability for providing commandtype steering information, relative to acquiring and maintaining a preselected course defined by one or more navigational aids, also are well known to aircraft operators and manufacturers. The range of capabilities of such systems extend from simple computations necessary to establish a fixed intercept angle on a preselected course and to gradually washout the intercept angle as the aircraft approaches a selected VOR radial, up to systems which have a capability for simultaneously monitoring signals from multiple navigational aids and generating non-aligned courses and flight paths, as well as climb and descent commands at appropriate points along the flight path.

While the display unit of the instant invention is adapted to accept signals from a large number of computer systems, the display presented to the pilot is established utilizing a common basic display unit, regardless of the capabilities of the systems employed in driving the unit 10.

To exemplify, one flight director computer meeting the requirements for expanded COMMAND MODE has been fabricated under contract NAS4-2199 with the National Aeronautics and Space Administration. Other computers are available from various aircraft instrument manufacturers, as previously noted. In other words, it is to be understood that all of the subsystems employed in driving the display unit for providing the displays herein discussed comprise commercially available systems which can be used without modification to supply the necessary driving signals to operate the unit 10. Therefore, a lengthy detailed discussion of each of the component parts, subsystems, and circuits employed in driving the unit 10 is deemed unnecessary and, accordingly, is omitted in the interest of brevity. It will, however, be appreciated that in some instances, minor signal conditioning, well within the skill of the art, may be required to obtain desired compatibility, however this conditioning is in the form of modification to voltage levels and is a function well known to those familiar with techniques employed in interfacing instrumentation equipment and systems.

Attention now is invited to FIGS. 1 and 3a through FIG. 6a, of the drawings, wherein there is illustrated, in block diagram form, a system having the capability for driving the unit 10 of the instant invention in a SITUATION MODE.

As herein employed, the term "SITUATION MODE" is intended to identify a mode of operation for the display unit 10 where attitude, altitude, and horizontal situation information for a piloted aircraft is displayed in an understandable manner so that the pilot is permitted to see a depiction of his aircraft's angular relationships and offsets with respect to selected VOR radials and altitudes, or with respect to selected ILS courses and associated glideslopes.

The display unit 10, as best shown in FIG. 1, includes an attitude gyro display 12, the purpose of which is to provide turn-bank information. A course deviation bar 14 is provided for indicating course deviation, relative to a selective heading or bearing. Similarly, a glideslope deviation bar 16 is provided for indicating positional error relative to a glideslope. Located immediately beneath the attitude gyro 12 there is a miniature airplane 18, the purpose of which is to pictorially illustrate a pilot's instantaneous heading relative to a selected bearing, while a control knob 20, is provided for use in selecting a heading or bearing digitally displayed at a window, herein designated 22. Additionally, a TO/-FROM window 26 is provided for providing intelligence indicative of the aircraft's position relative to a selective VOR, while an alternate action FRONT COURSE/BACK COURSE pushlight 28 is provided for providing approach information concerning positions relative to a selected localizer. Again, the intelligence and information displayed is in a form to be utilized in a manner fully understood by those familiar with aircraft instrumentation and operation.

Figures 3A, 3B, 3C:
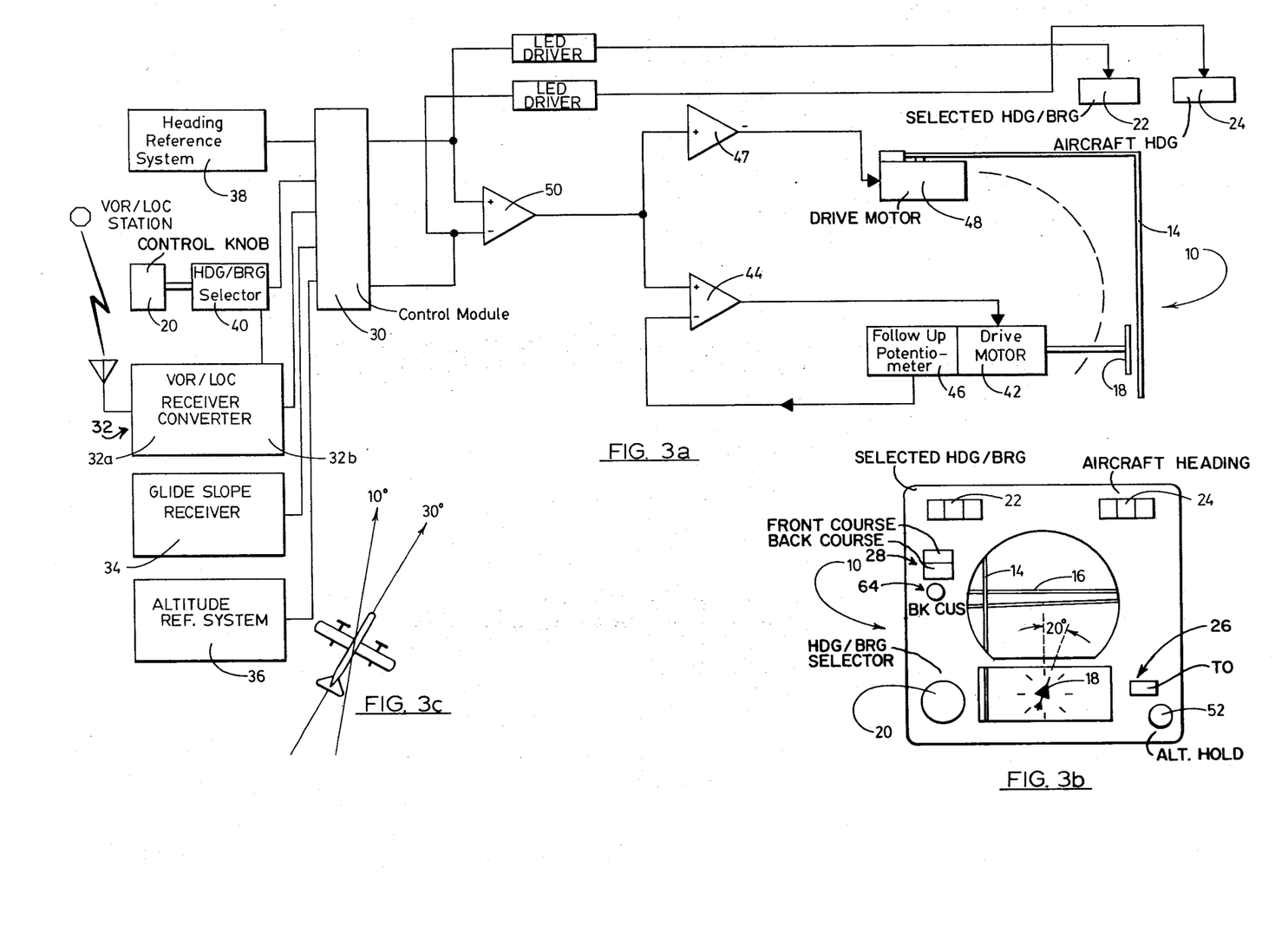
FIG. 3a is a schematic view, in block diagram form, of a system employed for driving the display unit in a HEADING SUBMODE of a SITUATION MODE.
FIG. 3b is a pictorial view of a display generated by the display unit driven by the system of FIG. 3a depicting the instantaneous situation of the aircraft, within which the system is mounted, relative to a selected VOR radial.
FIG. 3c is a pictorial view diagrammatically illustrating the instantaneous heading for the aircraft pictorially displayed in FIG. 3b relative to the selected VOR radial.

In the SITUATION MODE of operation, as depicted in FIG. 3a, the display unit 10 is attached to a control module 30 which, in turn, is connected to the various signal leads extended from a VOR/LOC converter circuit, designated 32 having subcomponents designated 32a and 32b, glideslope receiver circuit 34, altitude reference system 36, and heading reference system 38. The VOR/LOC converter circuit is designated 32a and 32b as a matter of convenience, but may be deemed to comprise a single circuit.

As an aid to understanding the instant invention, a few remarks concerning systems well known to aircraft operators and instrument manufacturers are presented, in less detail than would be required if the details of the systems comprised part of the claimed invention.

A ground VOR/LOC station provides necessary radio frequency signals which are commonly used to determine an aircraft's position with reference to the ground station and to enable an aircraft to follow a flight path directly toward or away from the station. The means to determine the radial on which the aircraft is located is provided by two signals having a phase difference that is a function of the angular displacement of the direction of the aircraft from a magnetic north direction. In this system, an omnidirectional reference signal is transmitted with a phase that is the same in all directions. A second directional signal is transmitted with a phase that is different for different directions from the station. The onboard VOR converter circuit, designated 32a, receives the two signals as 30 Hz voltages and, by comparing the phase of the two signals, the actual bearing from the VOR station is established. Of course, VOR stations are in common use in the United States airway system and their operation is well known to aircraft operators and instrument manufacturers.

As is also well known, for a ground localizer or LOC station a localizer antenna system generating two patterns is employed. One of the patterns is directed toward the left side of an associated runway while the other is directed toward the right. The signals of the two patterns have different amplitudes modulated at frequencies of 90 and 150 hertz. In order to determine the position of an aircraft with respect to the two amplitude modulated transmission patterns, an airborne receiver converter system, herein designated 32b, compare the strengths of the two received signals. The difference is signal strength between the two is a function of the offset of the aircraft from the centerline between the two at the point of overlap. This point of overlap occurs well to both sides of the runway and the signals are adjusted so that when the aircraft is on the centerline, the signal strength from each of the two patterns will be equal. The implementation of ground LOC systems also is well known to aircraft operators and instrument manufacturers, and it is commonly used at terminal areas throughout the United States and other countries.

The ground glideslope generating system 36 is similar to the ground LOC system, except that a pattern is radiated in a manner such that one signal is directed below the desired glide path and the other signal is directed above the desired glide path. The amplitudes of the transmitted signals are adjusted so that, when an aircraft is on the glideslope, both the upper and lower signals are received with the same signal strength. Glideslope systems are in common use in terminal areas throughout the United States and other countries, and the operation thereof also is well known to aircraft operators and instrument manufacturers.

Numerous heading reference systems are commercially available for aviation use, and their operations are well known to aircraft operators and instrument manufacturers alike. The system herein designated 38 preferably employs directional gyros which remain in a given angular orientation with respect to horizontal azimuth angle. As the aircraft turns, the housing rotates around the gyro forming different gymbal angles with the space stabilized directional gyro. Attached to the gyro gymbals by gearing, cabling, or direct shaft coupling are synchro transmitters having output voltages proportional to the relative angular positions assumed between the primary and secondary windings. Since the case of the synchro is generally fixed to the gyro frame, it rotates around the azimuth gymbal as the aircraft turns. The shaft, affixed to the azimuth gymbal remains stationary in space being mechanically affixed to the space stabilized directional gyro. Thus voltage outputs are obtained that are direct functions of aircraft heading. This and other types of heading reference systems are available from most of the previously named instrument manufacturers.

Altitude sensing systems, such as the system herein designated 36, are commonly used in aviation and serve convert ambient outside atmospheric pressure to altitude, which is represented in the form of an output voltage proportional to altitude. These systems have adjustment mechanisms which allow day-to-day variations in sea level atmospheric pressure to be inserted in the Kollsman window of conventional altimeters, in the form of "current altimeter settings" provided by control towers and weather stations operated by the Federal Aviation Administration. Altimeters or altitude sensing systems are available from the National Semiconductor Corporation of Santa Clara, California as well as from most of the previously named instrument manufacturing companies. Such systems, likewise, are well known to aircraft operators and instrument manufacturers.

Course and glideslope deviation indicators, including deviation bars, herein designated 14 and 16, respectively, are commonly used in many instrument systems designed by a variety of aircraft instrument manufacturers. These instruments are driven by signals obtained from the aforementioned onboard VOR/LOC converter and glideslope receiver, herein designated 32a, 32b, and 34, respectively. Typically, a standard 78 microamp glideslope deviation signal will provide approximately one-half-scale deflection on the horizontal and vertical bars thereof. Full scale deflection is normally achieved at approximately 150 microamps. The polarity of the voltage determines the direction of deflection up or down on the horizontal bar and left or right on the vertical bar. Course and glideslope deviation bars are in common use on many instruments, including both course and glideslope deviation indicators and flight director displays.

TO/FROM indicators, herein designated 26, also are well known and commonly used in VOR equipment designed by various instrument manufacturers including most of those previously mentioned. Based on the relationship between a selected course and an actual course sensed by the VOR/LOC converter, the VOR/LOC system will provide a signal of positive or negative polarity which will cause the TO/FROM indicator to move to the appropriate indication. The use and application of TO/FROM indicators, of course, are well known in the field of general aviation.

Course selectors, herein designated HDG/BRG SELECTOR and identified by the reference numeral 40, are commonly used on VOR/LOC display systems. The course selector is provided with a knob attached to the rotor of a resolver system which provides output voltages with phasing and amplitude representative of a selected OMNI bearing. These signals are fed to a comparator in the VOR/LOC converter which generates course deviation signals to drive the course deviation indicator bar, depending on the phase relationships between the course selector voltages and the reference and variable phase signals that determine the aircraft's angular location with respect to the VOR station on the ground. Course selector systems are commonly used on VOR equipment manufactured by King Radio Corporation and most of the other aircraft instrument manufacturers previously named.

In the preferred embodiment of the SITUATION MODE system, the control module, hereinafter more fully described, herein designated 30, is used to interconnect the various leads for signals derived from the commonly used receiver and sensor circuits, previously described, to the appropriate internal circuitry of the instruments under consideration.

The following discussion applies to various submodes of the SITUATION MODE of operation for the system which embodies the principles of the instant invention.

SITUATION MODE
(HEADING SUBMODE)

In the HEADING SUBMODE, of the SITUATION MODE, a drive motor 42, FIG. 3a, for the display unit 10 of the instant invention will cause the miniature airplane 18 to move to an angular orientation that represents the heading error of the piloted aircraft within which the system is mounted. If on a selected heading, the miniature airplane 18 will be positioned straight-up. If the heading for the piloted airplane deviates from a desired heading, the orientation of the airplane will vary. For example, if the heading is 20° to the right of the desired heading, the miniature airplane 18 will likewise be angularly positioned 20° to the right of the straight up position, FIG. 3b. This indication comprises the same display as would be seen by an observer lying along the selected heading and looking down on the piloted aircraft from above. When the piloted aircraft is on a desired heading, the miniature airplane 18 will be so oriented as to point straight-up, thus, again, providing the same pictorial representation as seen by the overhead observer.

If the piloted aircraft turns 90° to the left of the selected heading, the miniature airplane 18 also will turn 90° to the left to again present a picture as seen by the overhead observer. A secondary feature incorporated in this submode of operation is the use of the vertical bar 14 to represent the direction in which the selected heading lies, and thus to act as a vernier indication of heading error when the error is less than 10°. For example, if the selected heading is to the right of the actual heading (from 0° to 180°) relative to the nose of the piloted aircraft, the bar 14 will be to the right of center. If the error is greater than 10°, the bar 14 will be deflected fully to the right. Within 10° of error, the bar will be deflected by an amount proportional to the amount of the heading error.

Similarly, if a selected heading is to the left of the actual position of the nose of the piloted aircraft, then the bar 14 will be deflected to the left. As the piloted aircraft passes through the 180° of error point, in which the shortest direction to turn suddenly goes from left to right, or right to left, the bar will quickly move to the other side of the instrument indicating the shortest direction to turn has shifted from left to right, or right to left, as the case may be.

To drive the instrument in the HEADING SUBMODE of the SITUATION MODE, signals from the heading reference system 38, representing instantaneous aircraft heading, are summed at a summing circuit 44 with signals acquired from the heading or bearing selector 40 in order to generate a heading error signal. Since it is desired that the miniature airplane 18 display this same heading error, a follow-up potentiometer, designated 46, is attached to the drive motor shaft for the miniature airplane and its output signal summed with the heading error signal. By summing the two signals, which are of opposite polarity, a drive signal is generated to cause the miniature airplane drive motor 42 to move in a direction which will null the difference between the heading error signal and the miniature airplane position signal. When these signals null one another, the motor comes to rest with the miniature airplane at an angular displacement which represents the true heading error. As the heading error changes, the summing of the heading error signal and the miniature airplane position signal causes the miniature airplane to maintain an angular displacement matching the heading error of the piloted airplane, depicted in FIG. 3c.

As a secondary indication of heading error and as an indication to the pilot, for the piloted aircraft, of the "shortest direction to turn," the heading error signal is scaled at an amplifier 47 and directly applied to a drive motor 48 for the vertical bar 14. Thus, when the selected heading is to the right, the bar 14 deflects to the right. When the selected heading is to the left, the bar 14 deflects to the left. The amplifier 47 is of any suitable design having a required voltage amplification capability.

The summing, biasing, and scaling of the drive signals to the instrument can be accomplished using digital logic and the appropriate analog-to-digital and digital-to-analog conversions, as desired, although the same techniques can be used equally well for pure digital or pure analog circuitry.

(NAV SUBMODE)

Figure 4A:
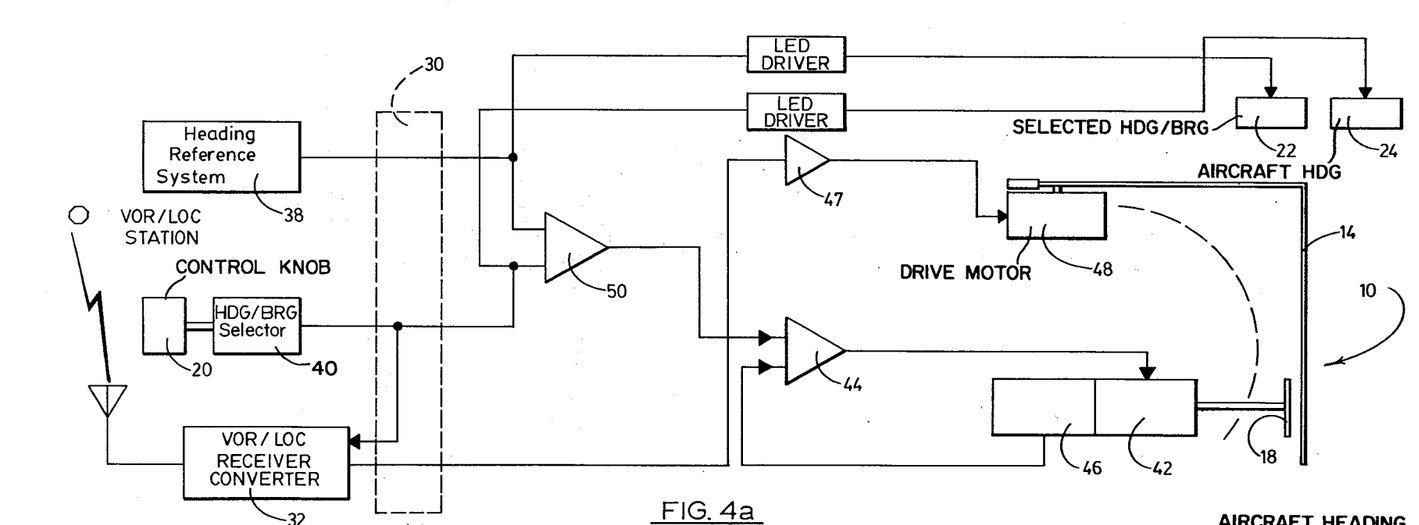
FIG. 4a is a schematic view, in block diagram form, of a system for driving the display unit in an NAV SUBMODE for a SITUATION MODE.
Figure 4B:
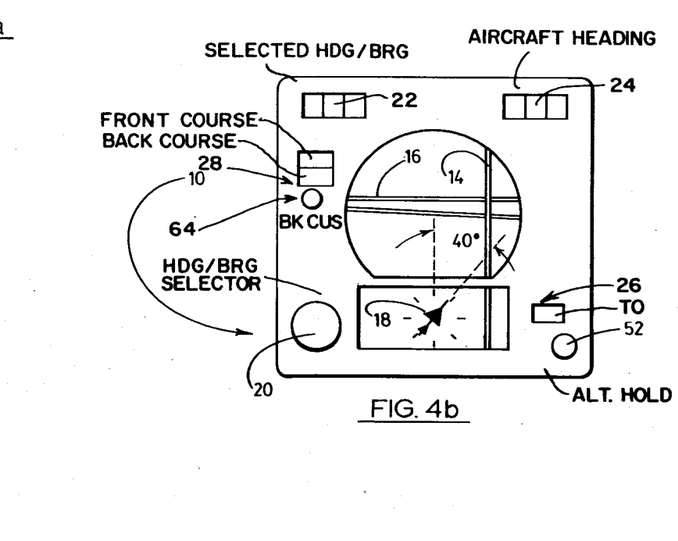
FIG. 4b is a pictorial view of a display generated by the display unit driven by the system illustrated in FIG. 4a, for an aircraft within which the system depicted in FIG. 4a is mounted, depicting the instantaneous situation of the aircraft relative to a selected VOR radial.
Figure 4C:
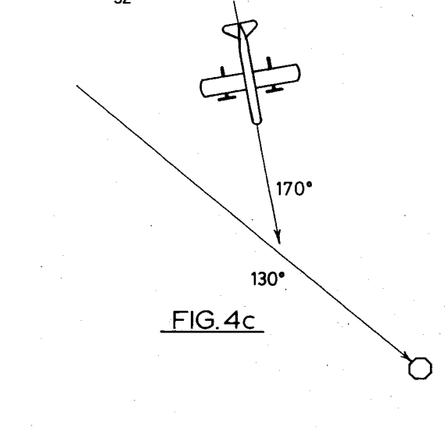
FIG. 4c is a pictorial view diagrammatically illustrating the instantaneous heading for the aircraft pictorially displayed in FIG. 4b, relative to the selected VOR radial.

In the navigation submode, herein simply referred to as NAV SUBMODE, the display unit 10 of the instant invention will cause the miniature airplane 18 to be driven in angular displacement to an angular orientation representing the heading error between the heading of the piloted aircraft, within which the system is mounted, and a selected inbound VOR radial, FIG. 4c. At the same time, the vertical course deviation bar 14 serves to indicate the left or right lateral offset of the selected inbound radial, FIG. 4b. Thus, if the piloted aircraft is established on the selected inbound radial and heading in an inbound direction to the station, the miniature airplane will assume a straight-up disposition, and the bar 14 will be centered over the miniature airplane. This is the same picture as would be seen by an overhead observer looking down on the piloted aircraft.

If, however, the piloted aircraft is to the left of the selected inbound radial but paralleling the direction of the radial, the miniature airplane will be in a straight-up disposition, but the vertical bar 14 will be displaced to the right, again provided a display corresponding to a field of view as seen by an overhead observer. If the pilot for the aircraft now turns 40° to the right, FIGS. 4b and 4c, in a corrective manuever, to intercept the radial, which is positioned to his right, the miniature airplane 18 also will turn 40° to the right but the vertical bar 14 will remain offset to the right until the corrective manuever starts to bring the piloted aircraft closer to the selected radial. Again, the display presentation is the same as is seen by the overhead observer, since the miniature airplane 18 also is turned 40° to the right and in the direction of the vertical bar 14. As the piloted aircraft corrects to the selected radial, the vertical course deviation 14, slowly moves back toward the center of the display.

In the implementation of the NAV SUBMODE, the heading selection accommodated by the SELECT knob 20 for a HDG/BRG SELECTOR circuit, of known design, is manipulated to provide a selection signal corresponding to a desired VOR radial. Signals from the VOR receiver/converter circuit 32a representing the present position of the aircraft with respect to the selected VOR radial are furnished to the course deviation bar, in substantially the manner in which signals are furnished for a normal VOR presentation familiar to aircraft operators and instrument manufacturers. However, when operating in the NAV SUBMODE, the VOR radial selection signal is also used as the heading reference signal and is summed, at a summing circuit 50, with instantaneous heading signals received from the HEADING REFERENCE SYSTEM 38 for providing an output to the driver motor 42. Thus, the miniature aircraft 18 is driven in the same manner as described for the HEADING SUBMODE so that the angular displacement of the miniature airplane 18 follows the error of the piloted aircraft heading relative to the inbound VOR radial, previously selected.

Hence, if the desired radial is to the right, the bar 14 will lie to the right of the miniature airplane 18. If the desired radial is to the left, the bar 14 will lie to the left of the miniature airplane 18, as illustrated. If the piloted aircraft is on a desired radial, the bar 14 will coincide with the center line of the miniature airplane, that is, it will be in the center of the display. Of course, if the piloted aircraft is paralleling the inbound heading of the selected radial, the miniature airplane 18 will assume a straight-up disposition. If the piloted aircraft is pointed left of the inbound heading of the selected radial, the miniature airplane 18 will be pointed left by a corresponding amount. If the piloted aircraft is pointed right of the selected radial inbound heading, the miniature airplane 18 will be pointed to the right by a corresponding amount.

(ALT HOLD SUBMODE)

Figures 6A, 6B:
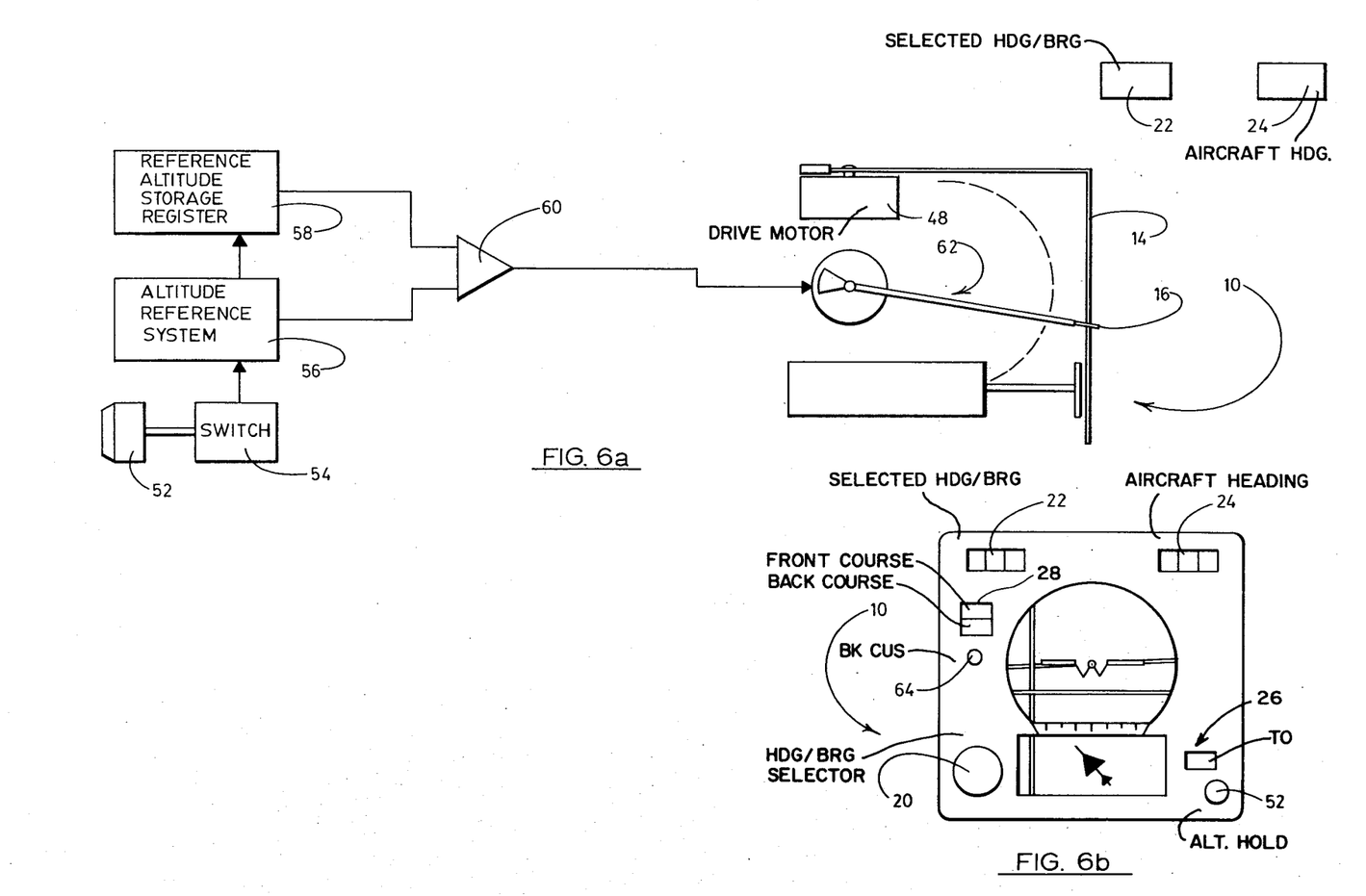
FIG. 6a is a schematic view, in block diagram form, of a subsystem provided for driving the display unit in an ALTITUDE HOLD SUBMODE for a SITUATION MODE.
FIG. 6b is a pictorial view of a display generated by the display unit shown providing situation and glideslope information.

An altitude hold submode, herein referred to as ALT HOLD SUBMODE, can be operated simultaneous, with either the HDG or NAV SUBMODES, aforementioned. In the ALT HOLD SUBMODE, the glideslope deviation bar 16 displays altitude error such that if the piloted aircraft is below a selected altitude, the horizontal bar will move up in the display. If the piloted aircraft is below the selected altitude, the bar 16 will move down in the display provided by the display unit 10. If the piloted aircraft is at the selected altitude, of course, the bar 16 will be centered in the display. This provides the same pictorial representation as would be seen by an observer looking at a "slice" of the atmosphere in which the selected altitude is represented by the bar 16.

Implementation of the altitude hold submode of the SITUATION MODE is accomplished employing a panel mounted ALT HOLD button, designated 52, FIG. 6a, mounted on a switch 54 connected within a circuit including an altitude reference system, designated 56 comprising an altitude transponder. The reference system 56 also is connected to a reference altitude storage register 58 of a suitable design. When the button 52 is depressed, the output voltage from the altitude transponder, of the system 56, is sampled and stored in the register 58. Upon release of the button 52, the output of the system 56 is summed, at a summing circuit 60, with the output of the register 58 constituting a stored value representing the altitude of the piloted aircraft at the time the ALT HOLD button 52 was depressed. An error signal thus obtained is scaled and used to drive a motor, generally designated 62, controlling the bar 16 of the display unit 10.

An initial selected altitude value as well as the subsequent current altitude values preferably are converted to digital form and processed by digital logic. The same or a similar technique can be used with analog circuitry employing a common sample and hold circuits for the reference signal and analog summing circuits to generate a necessary error signal.

(APPROACH SUBMODE)

Figures 5A, 5B, 5C:
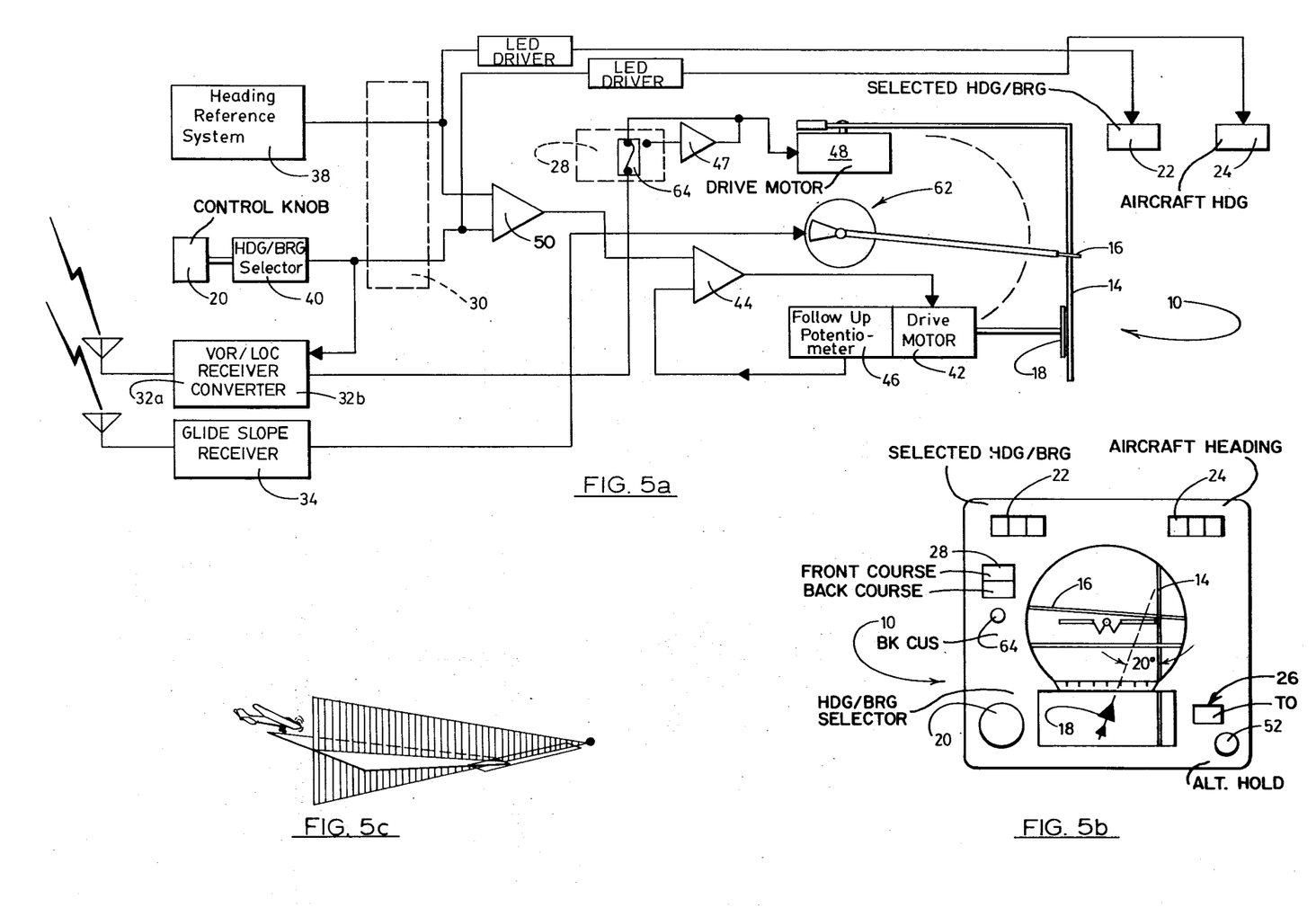
FIG. 5a is a schematic view, in block diagram form, of a system provided for driving the display unit in an APPROACH SUBMODE for a SITUATION MODE.
FIG. 5b is a pictorial view of a display generated by the display unit, driven by the system illustrated in FIG. 5a, providing situation and approach information for an aircraft in which the subsystem of FIG. 5a is mounted, illustrating the instantaneous relationship of the aircraft to a glideslope and a localizer course.
FIG. 5c is a pictorial view diagrammatically illustrating the aircraft, pictorially represented in FIG. 5b, relative to the glideslope and localizer course.

With reference to FIGS. 5a through 5c, it can be appreciated that when the system of the instant invention is mounted in a piloted aircraft on approach, FIG. 5c, and is operating in an APPROACH SUBMODE of the SITUATION MODE, signals derived from the heading reference system 38, the LOC receiving converter 32b as well as the glideslope receiver 34 are employed in driving the unit 10. In this mode, an error signal from the LOC converter 32b is applied directly to the vertical bar 14 thus representing position of the inbound course with respect to the piloted aircraft. The use of the vertical bar 16 is common to a wide variety of commercial displays. Thus, when the inbound course is off to the left, the bar 14 is deflected to the left. When the inbound course is off to the right, the bar 14 is deflected to the right. This requires a standard course deviation display and is driven directly by the outputs of the VOR/LOC converter. However, as in the NAV MODE, previously described, the selected inbound course is also used as a heading reference so that when the piloted aircraft is flying parallel to the inbound localizer course, the miniature airplane 18 is in a straight-up disposition. When the piloted aircraft is turned left of the inbound course direction, the miniature airplane 18 is offset to the left by the same angular displacement. Driving signals for the miniature airplane drive motor 42 are generated by summing, at a circuit 50, the inbound localizer course selection signal, generated by manipulating the knob 20, with the output of the heading reference system 38 to generate a heading error signal for the piloted aircraft. The heading error signal is then summed with the output of the miniature airplane 18 position feedback potentiometer, at the summing circuit 44, to develop drive signals for the miniature airplane drive motor 42. Again, when the heading error signal and the miniature airplane feedback position signal are of equal magnitude, the two signals null one another and the drive motor 42 stops until the true heading error changes, at which time the summing circuit 44 provides the necessary drive signals to the motor 42 to keep the miniature airplane offset at an angle equal to the piloted aircraft's heading error.

In the APPROACH MODE, the meter movement 62 for the horizontal or glideslope deviation bar 16 is supplied with error signals generated by the glideslope receiver 32. This allows the horizontal bar 16 to represent the glideslope so that when the piloted aircraft passes below the glideslope, the bar 16 deflects upward, and when the piloted airplane passes above the glideslope, the bar 16 deflects downward. This utilization of the glideslope deviation bar is common to many navigational displays and is well understood by aircraft operators and instrument manufacturers.

(BACK CUS)

The back course or BACK CUS SUBMODE is used when a back course approach is being made on a localizer or on a on-field VOR system. By depressing the alternate action pushlight 28, FIG. 1, the logic driving the bar 14 is reversed so that the true pictorial representation, as seen by an overhead observer, is preserved. This allows the pilot to continue to "fly to" the bar as with a standard front course approach, thereby eliminating the confusion that often exists when a pilot must fly away from the vertical bar in order to correct for off-course conditions. Thus, when BACK CUS is selected, the pilot may use the same correction logic (fly-to) as with the normal approach. In practice, suitable lamps are provided so that when BACK CUS is selected, the lower portion of pushlight 28 illuminates with an amber color and displays the words BACK CUS. Under normal circumstances, the upper portion of pushlight 28 illuminates green and displays the words FRONT CUS. On initial turn-on, at switch 64, the system defaults to the FRONT CUS mode. From that point on, when the pushlight 28 is depressed, the system alternately selects BACK CUS or FRONT CUS with each depression of the switch.

The back course submode can be selected with either the NAV or APPROACH SUBMODES.

COMMAND MODE

Figures 7A, 7B:
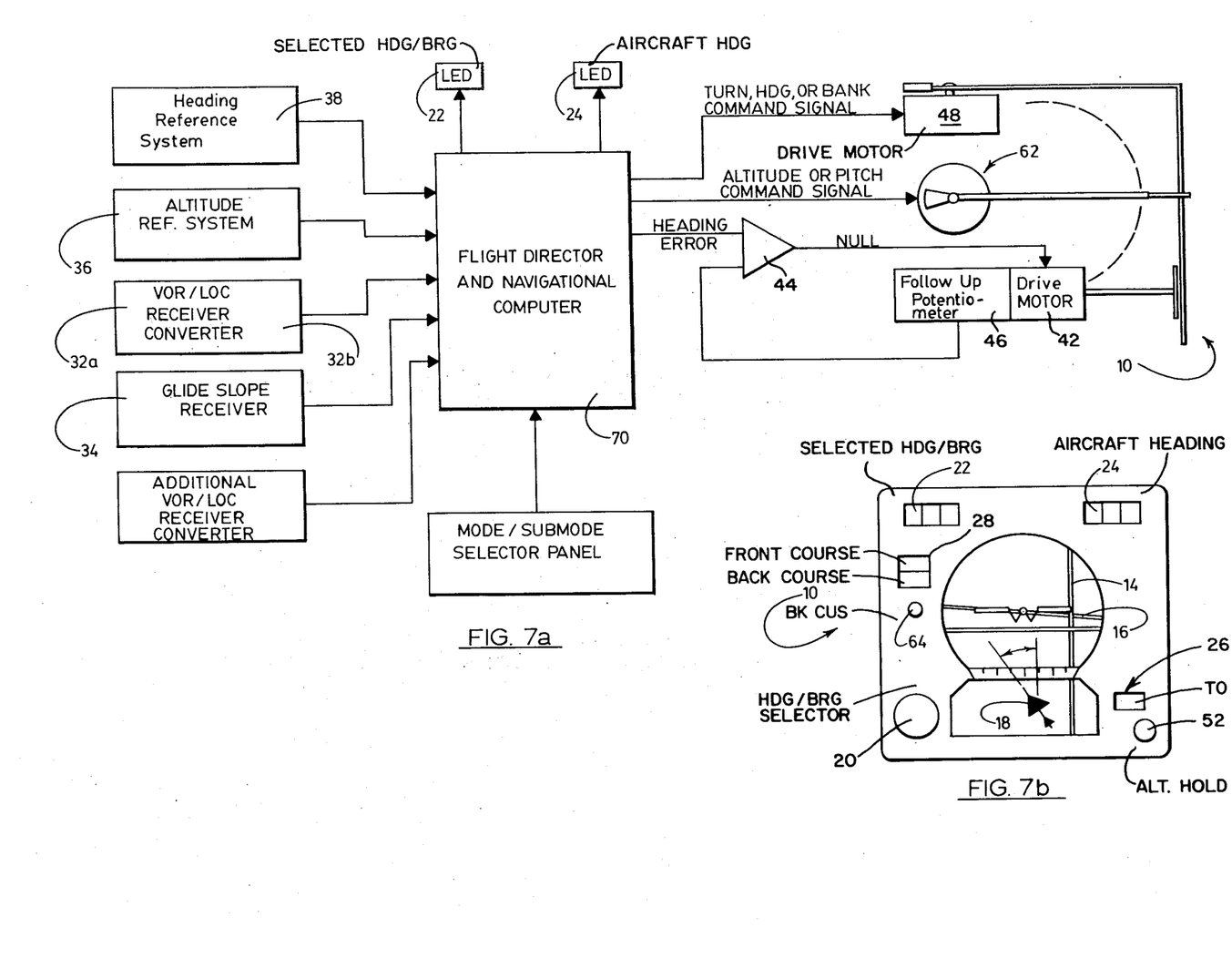
FIG. 7a is a schematic view, in block diagram form of a system provided for driving the display unit in a NAV or APPROACH SUBMODE for a COMMAND MODE.
FIG. 7b is a pictorial view of a display generated by the display unit depicting the instantaneous altitude and heading error for an aircraft in which the subsystem is mounted.

In the COMMAND MODE of operation, the signals used to drive the miniature airplane 18 and the vertical and horizontal bars 14 and 16, respectively, are all obtained from the flight director computer, FIGS. 7a and 7b. This allows computer-generated reference headings to be used in place of the headings selected manually in the SITUATION MODE. The implementation of the various submodes with the basic COMMAND MODE are as follows:

(HDG SUBMODE)

The system of the invention operating in a heading submode, HDG SUBMODE, in the COMMAND MODE operates in substantially the same manner as the system operates in the HDG SUBMODE, aforedescribed, for the SITUATION MODE. Therefore, a description thereof is omitted in the interest of brevity.

(NAV SUBMODE)

The NAV SUBMODE of the COMMAND MODE permits flight-director-generated heading commands to be used in place of the course selection made in the SITUATION MODE. A typical display configuration provides heading error information, displayed with the miniature airplane 18, and turn direction information displayed on the vertical needle 14. This allows the pilot of a piloted aircraft to respond to heading commands generated in a flight director computer, herein designated 70. Such heading commands are normally designed to smoothly bring an aircraft onto a course set into the computer and/or to maintain a selected course once it is established. Signals of this type have provided a flight director computer supplied under U.S. Government Contract NAS4-2199. As an alternative, when a fixed ground track is to be maintained, the computer is employed to generate heading error signals, as previously described, but provide a situation-type display on the vertical bar 14 to indicate the actual offset of the piloted aircraft from the desired geographic path.

In the NAV SUBMODE, computer generated vertical profile commands, such as climb, descend, and level are displayed on the horizontal bar in place of the altitude hold commands used in the SITUATION MODE.

(APPROACH SUBMODE)

In the APPROACH SUBMODE of the COMMAND MODE, the system of the instant invention provides computer-generated commands to the pilot of an aircraft equipped with the flight director computer 70. This typically includes heading error, displayed by means of the miniature airplane 18 and by use of the vertical bar 14 operated in the same manner as previously described under the HDG SUBMODE of the SITUATION MODE; and pitch error, which is the deviation in pitch of the piloted aircraft from that commanded by the computer 70. Using heading and pitch commands, the flight director computer, by means of the display unit 10 hereinbefore described, provides heading and pitch commands for smoothly bringing the piloted aircraft onto a desired final approach track, and onto the desired vertical profile that will ultimately bring the aircraft onto a selected runway. Such an implementation has, for example, been provided for by a flight director computer furnished to the government under Contract NAS4-2199.

It should be noted that the display unit 10 of the instant invention is capable of providing simultaneous horizontal and vertical situation or command information from the standard navigational devices previously described or from a flight director system which processes such information and generates guidance commands, tracks, or vertical/horizontal profiles which are to be followed.

It should now be apparent that the instant invention serves to reduce confusion during enroute navigation and destination approaches by reducing pilot scan requirements and presenting essential information in a manner which is intuitively simple for a pilot to interpret.

OPERATION

It is believed that in view of the foregoing description, the operation of the system readily will be understood, however it will be briefly reviewed at this point.

The system embodying the instant invention has been designed to provide combined attitude, altitude, and horizontal situation information so that a pilot for a piloted aircraft need monitor only one instrument during critical portions of a flight being conducted under instrument flight conditions. That is, angular information that normally would require observation of a directional compass or directional gyro display is provided by the miniature airplane 18 and the vertical bar 14 of the display. Altitude information, which would normally require observation of a separate altimeter, is provided by means of the horizontal bar 16 of the display unit 10; or, when in the aforedescribed APPROACH SUBMODE, glideslope information which normally would require the observation of a separate course/glideslope deviation indicator are available on the horizontal bar of the display unit 10. Lateral offsets, left or right, from a selected VOR radial, ILS localizer inbound course, or computer generated ground track is display in pictorial form using both the miniature airplane 18 and the vertical bar 14. When operated with a flight director computer, with the entire routine of flight preprogrammed into the computer, the entire flight is made with reference to just one single instrument allowing either command or situation information to be presented to the pilot to cause him to climb, level out, and descend the airplane at the appropriate times or places, thus to cause the pilot to follow a preselected or computer generated route of flight from his departure to his destination point, and to enable him to make an instrument approach at his destination airport.

In review, and referring to FIG. 1, the system is so designed that the miniature airplane 18 uses a straight forward display concept. The miniature airplane 18 serves as a pointer and indicates to a pilot his relative angular offset, left or right, from a heading or direction which he has selected to fly, or which has been selected by the flight director computer. To correct to the proper heading, the pilot simply turns left or right as is necessary to "fly" the miniature airplane 18 to a straight-up or forward indicating position.

In the heading submode or HDG SUBMODE of the SITUATION MODE, the course deviation bar 14 shows the pilot the shortest direction to turn to the selected heading. This compliments the information provided by the miniature airplane 18 in that, if the bar is to the left, the shortest direction of turn is to the left. If the bar is to the right, the shortest direction of turn is to the right. The same information can, of course, be obtained by observing the miniature airplane 18 and simply turning in the direction which will cause the least amount of angular rotation of the miniature airplane in achieving the straight-up forward position. However, while the movement of the nose of the miniature airplane may only move a fraction of an inch during 10° of angular travel, the vertical bar 14 may move from one to two inches when the heading error is within the last 10°. This permits heading errors of just a fraction of a degree to be easily discerned by the pilot.

In the navigation submode or NAV SUBMODE of the SITUATION MODE, the course deviation bar 14 displays the lateral offset, left or right, from a selected VOR radial. For instance, if the bar is to the left, the radial is to the left and the pilot turns his aircraft until the desired angular intercept angle is displayed between the miniature aircraft with respect to the vertical bar. As correction takes effect and the bar 14 starts to move toward the center of the display, the angular correction and current offset easily can be observed from the pictorial combination provided by the miniature airplane 18, with respect to the course deviation bar 14. Thus, as the course deviation bar slowly approaches the miniature airplane, the pilot may "wash out" the angular correction by slowly turning the miniature airplane so that, at the point when the course deviation bar is centered, the miniature airplane is in alignment with the bar. In short, in the navigation submode of the SITUATION MODE, a pilot is able to observe a "true" picture of his aircraft and its offsets and angular relationships with respect to a selected VOR course or radial. The tendency to overshoot is greatly lessened, since the closing rates and angular offsets are intuitively presented to the pilot in pictorial form that evokes a natural and correct pilot response.

In the APPROACH SUBMODE of the SITUATION MODE, a pilot selects the localizer channel on his VOR/LOC receiver and sets in the published inbound localizer course on this HDG/BRG SELECT knob 20 on the fact of the display unit 10. The selected course is displayed at windows 22 and 24 by light emitting diodes, or LED'S, at the upper portion of the unit. Again, as in the NAV SUBMODE, the position of the course deviation bar 14, left or right, indicates the direction of the inbound localizer course from the aircraft's present position. Using the same pictorial representation, the pilot adjusts the piloted aircraft's intercept angle by observing the angle of the miniature airplane 18 with respect to the vertical course deviation bar 14. As the piloted aircraft approaches the localizer course, the course deviation bar 14 moves toward the center of the display, given the pilot the "feel" that the miniature airplane 18 is flying toward the course. The pilot then simply adjusts the amount of angular correction used based on the intuitive "feel" provided by the closing rate of the course deviation bar with the miniature airplane, and the angular correction displayed by the miniature airplane with respect to the course deviation bar 14. At the same time, glideslope signals are presented on the glideslope deviation or horizontal bar 16 of the same display unit 10. This enables the pilot to simultaneously observe both his horizontal and vertical situation on the single integrated display.

Finally, in all of the various SITUATION and COMMAND SUBMODES, aircraft attitude, which is normally displayed on a separate attitude gyro display, is presented on the same display by the underlying gyro-type mechanization. Thus, in a single display, at the normal eye-to-instrument distance, all of the necessary flight parameters can be observed by the pilot using the single display and with no appreciable eye movement during the entire approach, except for crosschecks of engine instruments as may be occasionally necessary.

Selection of the basic modes and submodes of operation is accomplished with a standard selector panel. A typical selector panel was furnished under U.S. Government Contract NAS4-2199; however, many suitable selector panels are commercially available and familiar to operators of aircraft and manufacturers of aircraft instruments. Basically, through the use of switches, the selector panel interconnects the various receivers, converters, and display elements as described previously.

It should now be apparent that the aforementioned COMMAND MODE is essentially a heading mode in that the system concerns itself with turning the aircraft to a heading that is computed to bring the aircraft onto a desired VOR radial or localizer approach bearing, or to carry the aircraft along a preprogrammed sequence of courses and altitudes that may be necessary in navigating from a point of origin to a point of destination. When operating in the command mode, the pilot simply "flies" the miniature airplane 18 to a straight-up, forward-indicating position. When a new heading is required, as may be the case on arriving at a intermediate way point or fix, the computer will "wash in" a new heading command which manifests itself as a slow turn for the miniature airplane. The pilot senses the slow offset as a heading error and corrects by "flying" the miniature airplane to maintain the straight-up position, thus causing his aircraft to turn as commanded by the flight director computer. Obviously, the extent to which enroute navigational information can be automatically displayed is a function of the type of flight director computer selected and is not dependent on the instrument embodiment described herein. In certain cases, a complete origin to touchdown horizontal and vertical profile may be contained within the computer so that all climbs, turns, and course selections may be automatically made. In other instances, less sophisticated computers capable of generating simple intercept commands may be employed in all cases, however, the display techniques provided by the systems of the instant invention herein described are equally applicable.

Figure 8A:
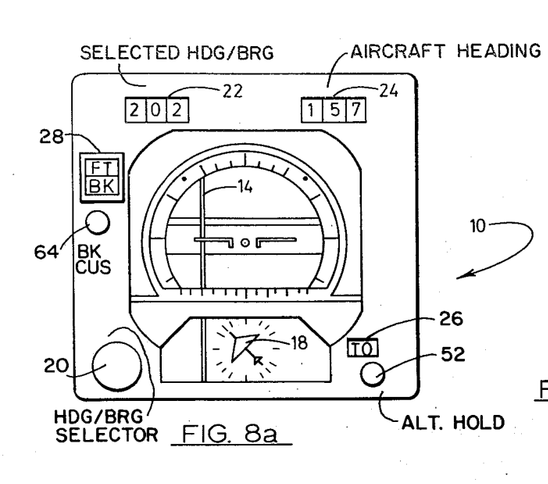

In order to further demonstrate the operation of the display during various common flight conditions, attention is invited to FIGS. 8a through 11b. In FIG. 8a, an aircraft, represented by the open arrow, is on a heading of 157° and is approaching a selected VOR inbound radial of 202°. This represents a common intercept condition when flying to a selected VOR radial. In FIG. 8a, the manner in which this condition is displayed to the pilot in the NAV SUBMODE of the SITUATION MODE is depicted. The miniature airplane 18 is directed toward the course deviation bar 14 by the exact intercept angle as is held by the piloted aircraft depicted in FIG. 8b. The selected radial is displayed in window 22 while the present aircraft heading is displayed in window 24. Window 26 displays a "TO" indication which advises the pilot that the selected radial, 202°, will take the aircraft to the VOR station. The "TO/FROM" indication is common to all VOR systems and is incorporated on all commercial VOR indicators.

Figures 8B, 9A, 9B:
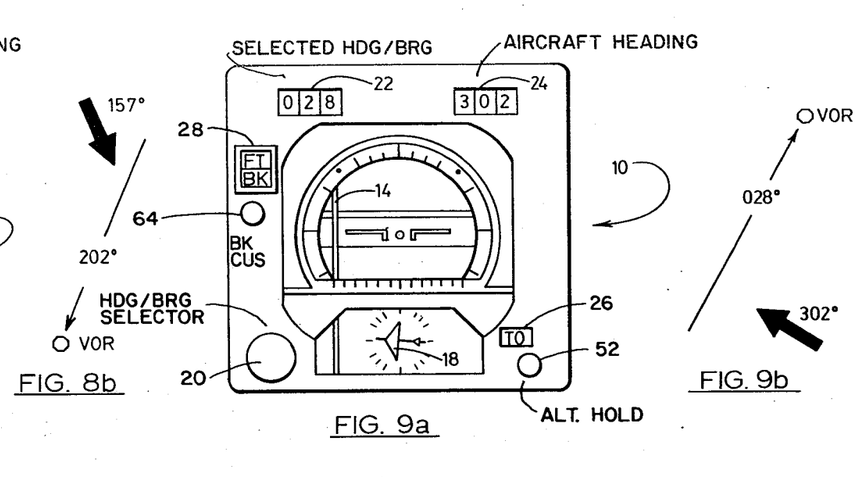

In FIGS. 9a and 9b, a typical arcing approach is shown. The true position of the piloted aircraft with respect to the inbound radial, 028°, is shown in FIG. 9b. The piloted aircraft, represented by an open arrow is approaching at a 90° intercept angle. The instrument presentation, shown in FIG. 9a, provides the exact same pictorial indication to the pilot. As the piloted aircraft nears the inbound 028° radial, the pilot, by observing the display presentation of the unit 10, can easily make a smooth and coordinated turn onto the inbound course. Again, the inbound radial, 028°, is displayed in the selected course window 22 and the present aircraft heading, 302°, is displayed in the heading window 24. Based on the aircraft's present position, capturing the 028° radial will take the aircraft to the VOR station, as indicated by the indicator 26.

Figures 10A, 10B:
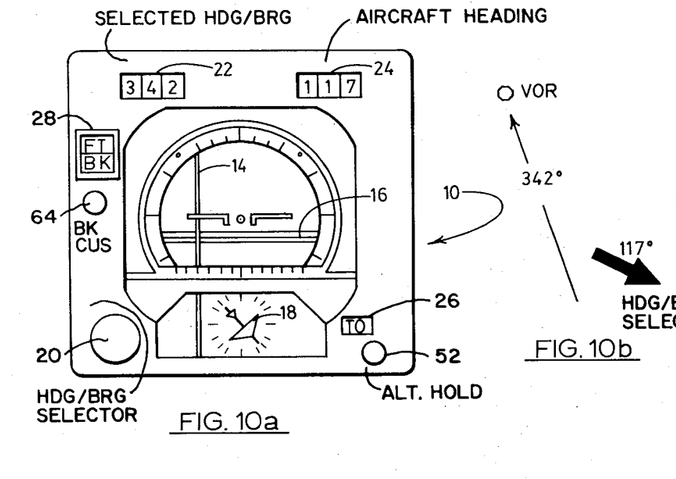

FIGS. 10a and 10b, collectively, depict a situation common to the commencement of a procedure turn, a maneuver well understood by aircraft pilots and operators. In this situation, the piloted aircraft has proceeded outbound along the reciprocal of the 342° radial and has commenced a 45° turn away from the radial in order to make a "procedure turn" back onto the inbound 342° radial. For information only, it may be noted that the procedure turn is used when an approach is commenced from directly over the station and the aircraft must descend from a higher cruising altitude to a lower approach altitude and become established on a final approach VOR course. As can be seen in FIG. 10a, the true pictorial representation of the aircraft orientation with respect to the inbound 342° radial is clearly presented on the instrument display. Again, the selected radial value is displayed in the window 22 and the aircraft heading is displayed in the heading window 24. Again, the "TO" signifies that, with reference to the aircraft's present position, a 342° radial will carry the aircraft "to" the station. The low position of the horizontal bar 16 of the display unit 10 indicates the airplane is above the level-off altitude.

Figures 11A, 11B:
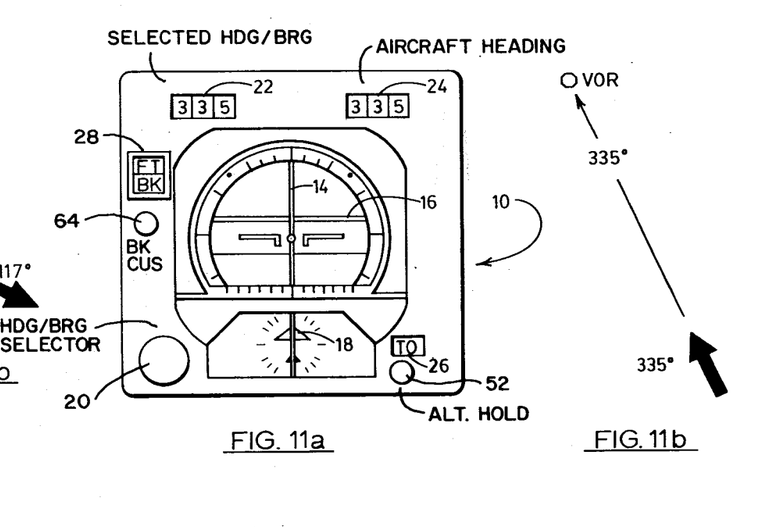

In FIGS. 11a and 11b, an on-course situation is presented. Here, the piloted aircraft is established on a selected VOR radial and proceeding inbound toward the station. The course deviation bar 14 is centered indicating the piloted aircraft to be on the selected radial and the miniature airplane 18 is pointed straight-up, indicating the heading to be the same as the heading of the inbound radial. In this case 335° is displayed in both the selected course window 22 and the present heading window 24. The slightly high horizontal bar 16 indicates that the piloted aircraft is slightly below the selected altitude.

In view of the foregoing, it should be apparent that the instant invention provides for a practical display which is intuitively simple for a pilot to interpret.

What is claimed is:

1. In a display unit adapted to be mounted in a cockpit of a piloted aircraft for pictorially presenting combined inflight course, altitude, and horizontal situation information relative to a selected course and altitude, the improvement comprising in combination:

A. a horizontal situation indicator for providing heading intelligence including a window having a transparent face disposed in a plane normally related to the longitudinal axis of the cockpit, a pointer mounted for visual observation through the face of said window pictorially depicting an instantaneous heading of the piloted aircraft relative to the selected course comprising a miniature aircraft supported for rotation about an axis normally related to the plane of said window, said window having a top, the center point of the top of the window being located above the axis of the pointer when the aircraft is in a normal level flight attitude, means for driving said miniature aircraft to an on-course position when the position of the piloted aircraft is on the selected course and the heading thereof is coincident with the bearing of the course, said on-course position being indicated by the miniature aircraft when the nose thereof is pointed toward the center point of the top of said window, and means including a drive motor connected to said pointer and a heading error signal generator connected to the drive motor for angularly displacing the pointer from said on-course position to a heading error position wherein the nose is pointed at an angle relative to a line extended between the axis of the pointer and the center point equal to the instantaneous angle defined between the bearing of the selected course and the instantaneous heading for the piloted aircraft;

B. a course deviation bar extended downwardly from the top of said window and supported for displacement along a path extended horizontally across the face of the window, and means including a beacon signal/converter and a drive motor for displacing said bar along said path in directions and through distances corresponding to instantaneous directions and distances of the piloted aircraft relative to the selected course; and C. an altitude deviation bar extended horizontally across the window, and means including an altitude error-signal generator and a motor connected to said altitude deviation bar for displacing the altitude deviation bar vertically across the face of said window as the altitude of the aircraft deviates from a selected altitude for the piloted aircraft.

2. An improvement as defined in claim 1 wherein said beacon signal receiver/converter comprises a VOR/LOC receiver converter.

* * * * *